United States Patent [19]
Vitkus et al.

[11] Patent Number: 5,786,996
[45] Date of Patent: Jul. 28, 1998

[54] APPLIANCE CONTROL CIRCUIT COMPRISING DUAL MICROPROCESSORS FOR ENHANCED CONTROL OPERATION AND AGENCY SAFETY REDUNDANCY AND SOFTWARE APPLICATION METHOD THEREOF

[75] Inventors: Kimble Ally Vitkus, Sycamore; Joseph Stewart Calabrese, Arlington Heights, both of Ill.

[73] Assignee: Eaton Corporation, Cleveland, Ohio

[21] Appl. No.: 672,323

[22] Filed: Jun. 28, 1996

[51] Int. Cl.$^6$ .......................... G05B 19/048; H05B 1/02
[52] U.S. Cl. .................. 364/187; 364/551.01; 364/550; 364/557; 364/230.4; 364/230; 364/230.6; 364/268.3; 364/268.8; 364/269.4; 395/182.08; 395/182.09; 395/184.01; 219/506; 219/413; 219/414; 219/451; 219/453; 219/702; 219/710; 219/661; 219/662
[58] Field of Search .................. 364/187, 551.01, 364/550, 557, 230, 230.1, 230.3–230.4, 230.6, 268.3, 266.8, 269.4; 395/182.08–182.09, 184.01; 219/526, 412–413, 451–453, 481–483, 490–492, 702, 714, 715, 710, 661, 662

[56] References Cited

U.S. PATENT DOCUMENTS

| | | |
|---|---|---|
| 4,380,698 | 4/1983 | Butts .......................... 219/492 |
| 4,611,295 | 9/1986 | Fowler ........................ 364/184 |
| 4,860,289 | 8/1989 | Coulson .................... 395/182.13 |
| 4,922,081 | 5/1990 | Kadwell et al. .............. 219/506 |
| 4,983,811 | 1/1991 | Oppor et al. ................. 219/497 |
| 5,015,827 | 5/1991 | Kadwell et al. .............. 219/497 |
| 5,321,229 | 6/1994 | Holling et al. ............... 219/448 |
| 5,349,162 | 9/1994 | Holling ........................ 219/453 |
| 5,378,874 | 1/1995 | Holling et al. ............... 219/506 |

*Primary Examiner*—Emanuel Todd Voeltz
*Assistant Examiner*—Tuan Q. Dam
*Attorney, Agent, or Firm*—Fay, Sharpe, Beall, Fagan, Minnich And McKee

[57] ABSTRACT

An appliance control circuit comprising dual processor control for enhanced control operation and agency safety redundancy. A first processor is disposed in operative communication with operator control switches for primarily controlling the supply of power for principal appliance functions. A second processor is in operative communication with the first processor and disposed for primarily monitoring appliance safety detection circuits and for controlling agency circuitry redundancy through a second switch in series with the first switch. The first and second switches comprise agency circuitry for enabling said supply of power when said first switch is directly enabled by the first processor and the second switch is directly enabled by the second processor for safety redundancy of said power supply.

11 Claims, 7 Drawing Sheets

APPLIANCE CONTROL CIRCUIT COMPRISING DUAL MICROPROCESSORS FOR ENHANCED CONTROL OPERATION AND AGENCY SAFETY REDUNDANCY AND SOFTWARE APPLICATION METHOD THEREOF

BACKGROUND OF THE INVENTION

This invention pertains to the art of electric control circuits and software processes implemented therein, and more particularly to a processor based control circuit operated by an individual user, such as a typical home consumer.

The invention is particularly applicable to an appliance control circuit used for controlling an operation of an electrically heated oven and, more particularly, to an oven including safety circuits to protect against potentially dangerous situations such as loss of heat regulation of the oven cavity, or preventing an oven door from opening when the cavity is at a temperature above 600° F. However, it will be appreciated by those skilled in the art that the invention can be related to use in other environments, as, for example, where similar enhanced control operations and agency safety redundancy is desired as a part of other types of control systems.

Related conventional control designs have tended to comprise topologies that use many discrete parts. Typically, a single large microprocessor is employed as the central and prominent control device and elaborate discrete circuits must be provided in association with the microprocessor to provide agency safety operation. The typical electronic oven controller often utilizes a single microprocessor to electronically control various oven functions, such as temperature, timer settings and so forth. However, with these controllers, redundant hardware is also utilized in order to provide certain safety features designed to protect the use and the oven. Current minimum safety design requirements are such that the failure of any one component cannot cause a non-operative mode in the oven. For example, if the oven is set for an oven cleaning mode, the door latch must be detected as closed or the power to the heating coils to run in the cleaning mode cannot be supplied. Such preexisting elaborate discrete circuit designs employed numerous comparators, OP AMPs, discrete resistors, capacitors, and PC board space to accommodate all of such items. Accordingly, such circuits were undesirably complex and costly. The processor would operate the normal control operation and a substantial portion of the discrete circuit would provide monitoring and control of agency safety-type functions, i.e., the agency circuitry. It should be kept in mind that the agency circuitry requirements are very important since the class of user for the appliance is an ordinary consumer.

The dual microprocessor controller of the present invention provides a significant improvement over previous controllers in that many of the same safety features can be provided with only an additional microprocessor as hardware while increasing the sophistication of safety monitoring and providing additional functionality as well. The invention contemplates a new and improved control circuit design which reduces the complexity and cost of such prior known control designs by dividing the microprocessor duties between two distinct microprocessors and incorporating the agency circuitry responsibility into at least one of the microprocessors. The design is readily adaptable to a plurality of appliances having a variety of different types of functional operations. The invention reduces the parts count of prior known systems and expands the control capabilities thereover.

BRIEF SUMMARY OF THE INVENTION

In accordance with the present invention, there is provided an appliance control circuit comprised of dual microprocessors for enhanced control operation and agency safety redundancy. The first processor acts as a master of the second processor and is disposed for primarily operating the normal control operations. It controls a supply of power for principal appliance functions, such as the power relays, thermistors, display and beeper, and monitors the operator control switches. The second processor acts as a slave to the first processor and provides agency redundancy by controlling the safety switches serially connected to the power relays. The second processor is in operative communication with the first processor and is disposed for primarily monitoring the appliance safety detection circuits, and for controlling the agency safety redundancy such as the safety switches which control the power relays. First and second transistor switches enable the supply of power for principal appliance functions. The first switch is directly enabled by the first processor and the second switch, comprising a part of the agency circuitry, is enabled by the second processor for safety redundancy in the supply of power.

In accordance with another aspect of the present invention, the appliance control circuit further includes a plurality of first switches directly enabled by the first processor for respectively initiating the plurality of principal appliance functions. Second switches are serially connected to each of the plurality of first switches for opening said supply of power in accordance with predetermined conditions of said appliance safety detection circuits.

In accordance with a more limited aspect of the present invention, the control circuit comprises an oven control circuit for an oven including a bake circuit and a broil circuit and wherein the second processor includes a bake/broil safety output in communication with said second switch for disabling said bake circuit and said broil circuit in accordance with predetermined conditions of said appliance safety detection circuits.

In accordance with an other yet more limited aspect of the present invention, the control circuit includes a temperature probe and a one of said predetermined conditions comprises a sensing of an oven temperature by said probe in excess of a preselected temperature and detection of an open oven door, whereby the second switch is opened by a signal from the second processor at the bake/broil safety output.

In accordance with an alternative aspect of the present invention, the first and second processors can accomplish shared responsibilities between a primary control and safety redundancy onto more equalized memory requirements between the processors and thereby reduce the memory requirements of any one processor. More specifically, power relay control can be transferred from the first processor to the second processor while disabling control of the relay safety switches can be transferred to the first processor. Similarly transferred functions from the first processor to the second processor could comprise thermistor monitoring and beeper or annunciator control while functions transferred from the second processor to the first processor could comprise a door safety disable.

One benefit obtained by use of the present invention is an appliance control circuit which provides enhanced control operation and agency safety redundancy.

Another benefit obtained from the present invention is an appliance control circuit which reduces the complexity and cost of prior known circuits by dividing processor duties between two microprocessors and incorporating the agency circuitry into one of the microprocessors..

3

Other benefits and advantages of the subject control circuit will become apparent to those skilled in the art upon a reading and understanding of the application.

BRIEF DESCRIPTION OF THE DRAWINGS

The invention may take physical form in certain parts and arrangements of parts, the preferred embodiment of which will be described in detail in this specification and illustrated in the accompanying drawing which forms a part hereof and wherein.

DETAILED DESCRIPTION OF THE INVENTION

Figure 1:
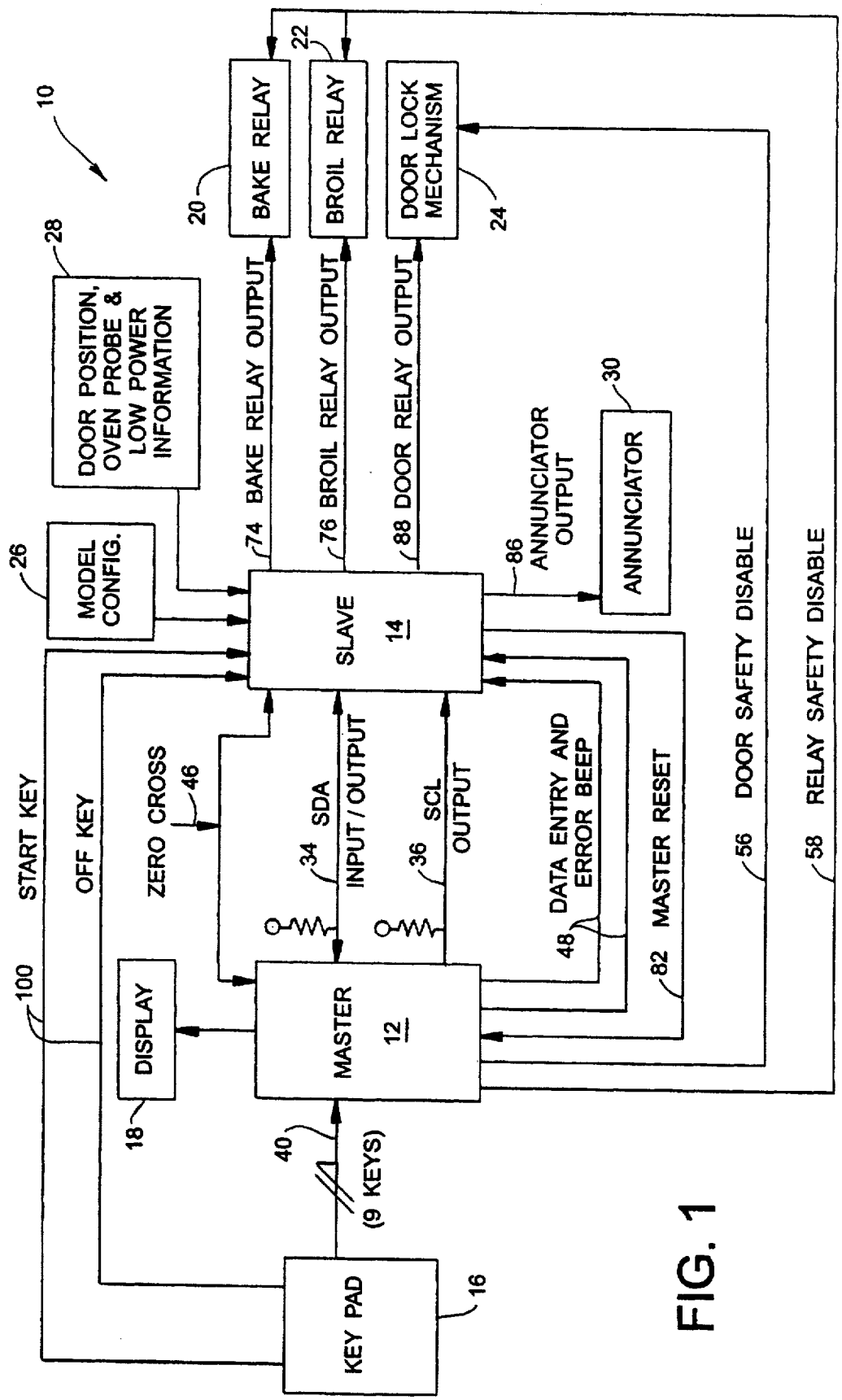
FIG. 1 is a block diagram of the present dual-microprocessor controller and associated hardware.

Referring now to the drawings wherein the showings are for purposes of illustrating preferred embodiments of the invention only, and not for purposes of limiting same, the FIGURES show an appliance control circuit comprising dual microprocessors for enhanced control operation and agency safety redundancy. The circuit is particularly applicable to an oven or heating range and will be described with reference thereto.

Turning now to FIG. 1, the present oven controller and associated hardware are illustrated schematically at 10. Controller 10 includes dual microprocessors, a master microprocessor (commonly referred to as "micro") 12 and a slave micro 14.

Master micro 12 generally controls the interface between the user and the oven while slave 14 manages oven operation and monitors status information provided by the oven. Master 12 therefore receives electrical signals produced by user operation of a key pad 16 and controls a corresponding display device 18, typically a digital LED pad which displays information such as the current oven temperature or the timer setting. Slave micro. 14, in contrast, communicates with bake and broil relays, 20 and 22 respectively, as well as a door lock mechanism 24, an input device 26, information sensors 28 and an annunciator 30.

Figure 2:
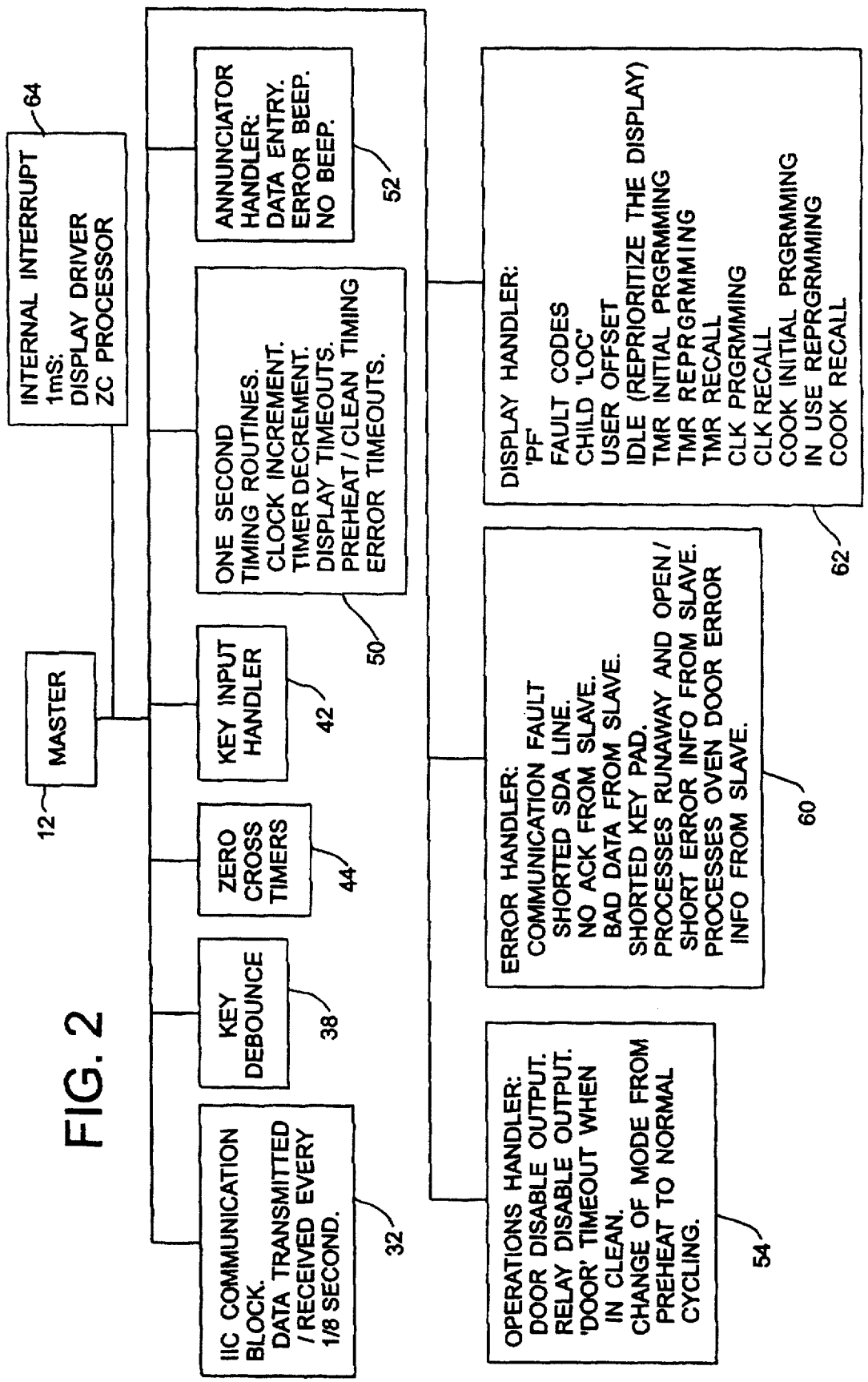
FIG. 2 is a functional schematic diagram illustrating the various software modules of the master microprocessor of the present controller.

Taking FIG. 1 in combination with FIG. 2, which illustrates the various functional modules of the master 12, wherein each module is preferably implemented in software running on the master micro 12, the operation of controller 10 can now be described in detail. Master 12 includes a communication module through which the transmitter/receiver of master 12 clocks data to and from slave micro 14 over SDA input/output line 34 and SCL output line 36. The protocol used in these transmissions is a form of IIC, modified to eliminate sending a device address and use of a stop bit. Between one and two bytes of data is transferred every ⅛ second, in a manner described below in conjunction with FIG. 4.

A key debounce module 38 is used to read in user input information over a line 40 from key pad 16. This module filters out key debounce to determine whether a valid key press has been made. The information read and validated by key debounce module 38 is interpreted by key input handler module 42. This module processes all valid key inputs and determines what action to take based upon those inputs, these actions being based both on current display information and the key pressed. For example, a key input indicating the pressing of a key responding to "up" when combined with a message on display 18 indicative of a timer display would increment the timer setting while the same key input combined with a displayed user selected bake temperature would increment the bake temperature setting. The display 18, of course, will reflect the increment in both cases.

A new zero cross detector module 44 processes timing routines that take less than one second based on a zero cross input signal 46 which is derived from the AC line (not shown). These routines including resetting data entry and error beep communication lines 48 to a no beep state after transmitting a beep request. A one second timing routine module 50, in contrast, processes routines taking more than one second, such as those controlling the time of day clock, minute timer, preheat time, clean time, error time-outs and display time-outs.

An annunciator handler module 52 places a request for either a data entry beep or error beep onto lines 48 to slave micro 14 for controlling annunciator 30. In the present embodiment annunciation of various user feedback and events is accomplished through the provision of audible beeps. Alternately, however, other annunciation means known to those of skill in the art could alternately be employed. An operations handler module 54 controls the door safety disable line 56 and relay safety disable line 58 and also determines whether slave micro 14 can advance from a preheat cook to a normal cook cycle.

An error handler module 60 monitors the error status from slave micro 14 and monitors lines 34 and 36 for communication faults. This module also determines an appropriate error time-out period and requests that an error code be displayed on display device 18. A display handler module 62 updates display 18 with all necessary operation information while an internal interrupt module 64 multiplexes display 18 and determines if a valid zero cross has occurred.

Figure 3:
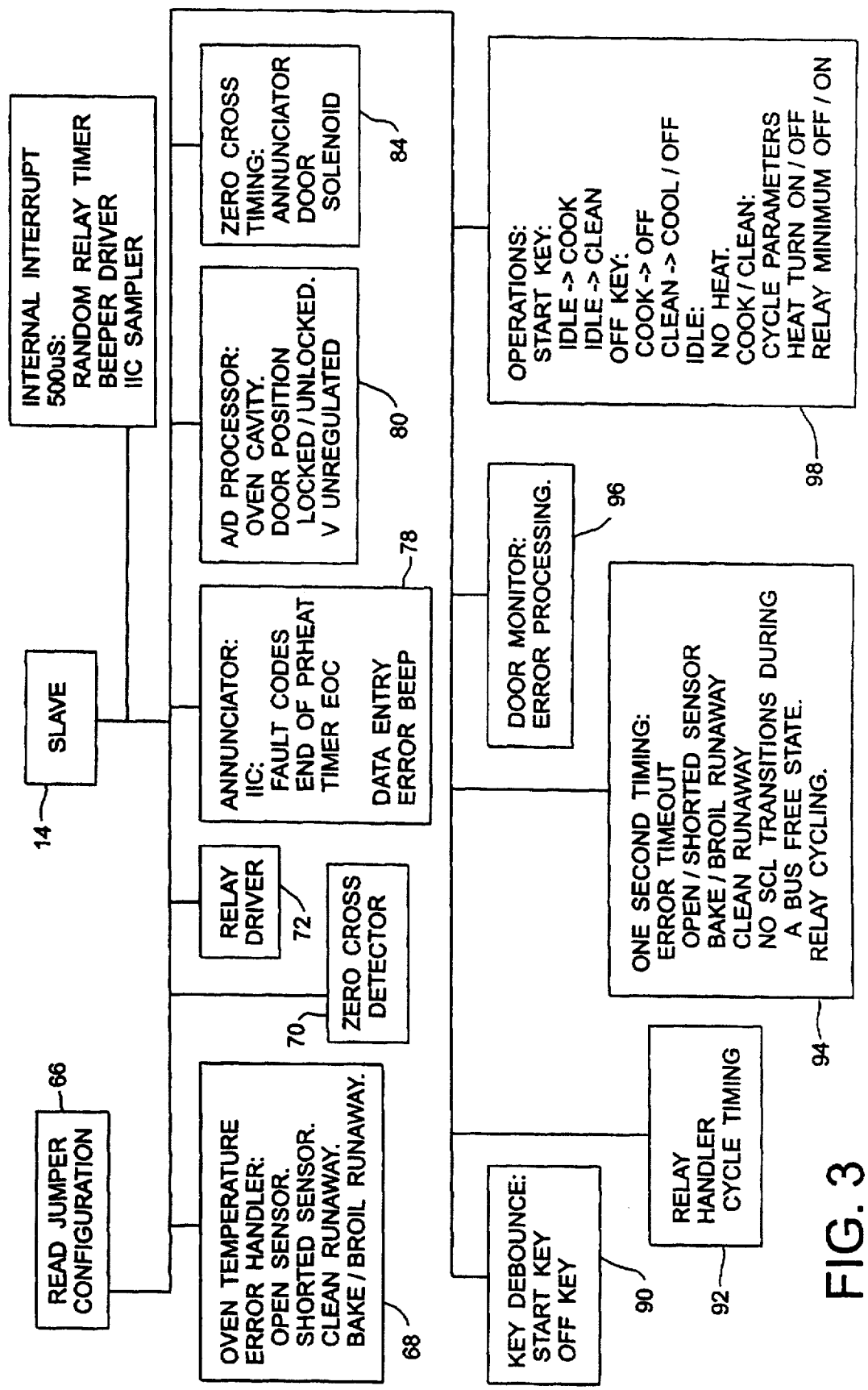
FIG. 3 is a schematic similar to FIG. 3, but illustrating the various software modules of the slave microprocessor.

Turning now to FIG. 3, a similar illustration is provided for the various function modules of the slave microprocessor 14. These modules are also preferably provided in software, running on slave micro 14. A model module 66 reads a jumper configuration from device 26 in order to determine whether the oven is gas or electric, pyro or non-pyro. In this manner the same electronics controller can be utilized for various oven types.

An oven temperature error handler module 68 monitors information received from oven probe sensor 28 to determine if any sensor faults have occurred. A zero cross detector module 70, like that for master micro 12, monitors the zero cross input from line 46 to determine whether a valid zero cross transition has occurred.

A relay drive 72 is used by slave micro 14 to control the bake and broil relays 20 and 22 over control lines 74 and 76 respectively. An annunciator module 78 monitors communication line 34 for a request from master 12 to turn on the beeper for fault codes, end of preheat timer, end of cycle beeps and similarly monitors data entry and error beep lines 48 for beep request.

An analog to digital (A/D) processor module 80 determines the oven cavity temperature, door position, locked/unlocked status and whether a low power or reset threshold has been reached based on signals received from sensor 28. If the unregulated voltage falls below a reset threshold, slave micro 14 will reset master micro 12 by holding master reset line 82 low until the unregulated voltage level returns to the normal operating level. When this occurs, slave 14 rebases reset line 82.

Zero cross timing module 84 processes timing routines that are less than one second. This includes beeps less than one second by annunciator 30 over line 86 and the flaring of the door solenoid via signalling door lock 24 over line 88. The zero cross input is obtained from the A/C line via line 16 and processed by the zero cross detector module 70.

Key debounce module 90 processes off and start key presses on the key pad 16. This provides redundancy for safety purposes by requiring that both slave 14 and master 12 receive and validate a start key press before beginning to cook or clean and an off key press prior to turning off. The software also has the capability of discriminating between types of key presses and determine the appropriate response logic.

A relay handler module 92 determines cycle times for activating the bake and broil relays, 20 and 22, according to information from input 26 regarding the oven type. One second timing module 94 processes cycle timing and error time-outs. Door monitor module 96 determines, based on whether or not the oven is cleaning, whether the door should be locked or unlocked and therefore controls door lock mechanism 24 by producing an appropriate control signal over line 88.

An operation handler module 98 determines whether a valid cook or clean command has been transmitted from master micro 12, monitors the start and off key inputs over lines 150, updates a RAM with the current model's cooking and cleaning parameters and cycles the heat on and off during cooking and cleaning via relays 20 and 22.

Figure 4:
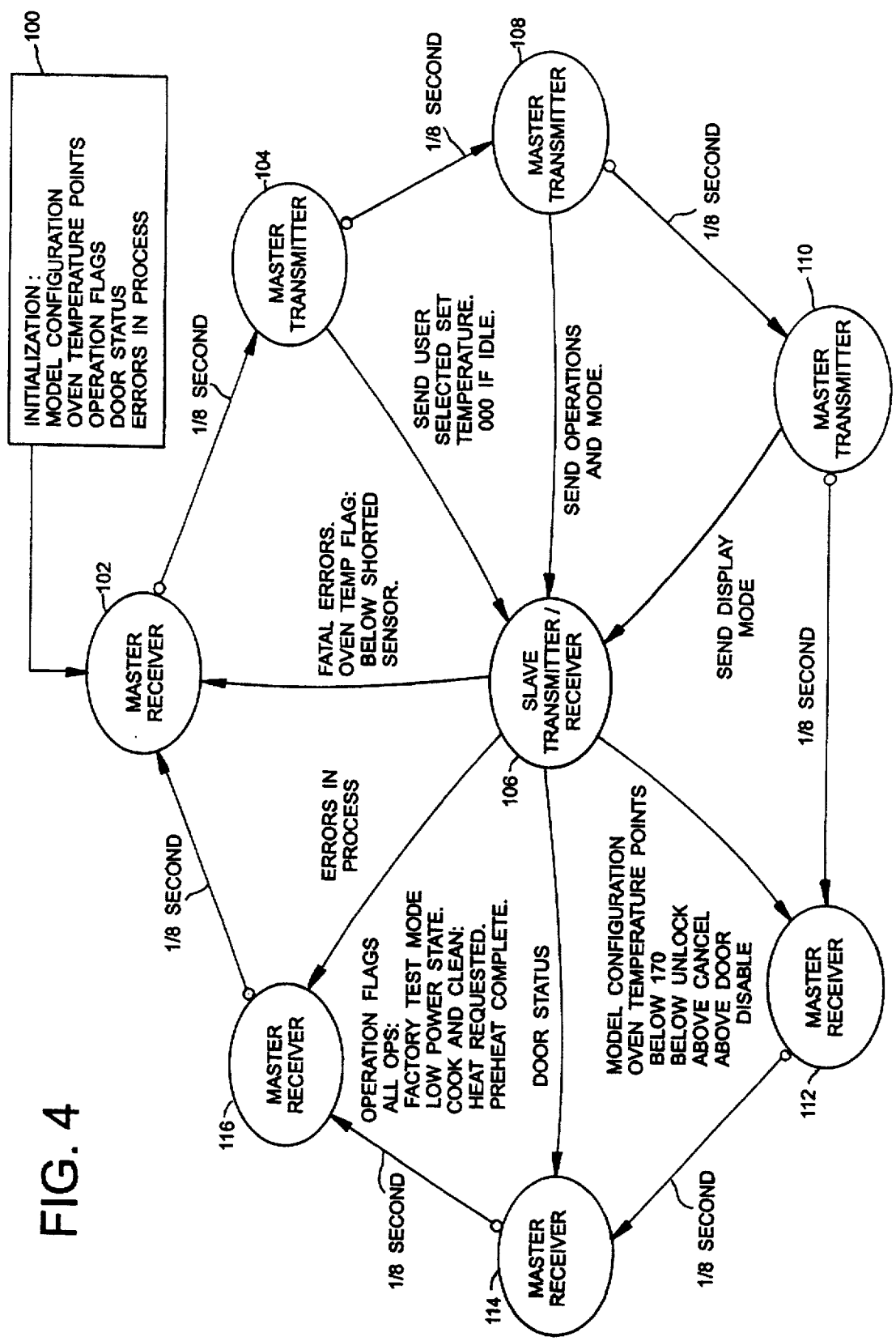
FIG. 4 is a functional illustration of the communication route between the master and slave microprocessors.

With reference to FIG. 4, a block diagram of the internally operating communication scheme implemented by the subject invention is shown. An initialization 100 occurs at power up, and the master receiver 102 receives the basic data from a conventional source, such as user input or a read only memory, which identifies the particular oven in which the control system is installed. Such basic data comprises the model configuration, the oven temperature points, which will typically vary between ovens of different types, the preliminary operation flags, the oven door status and whether any monitored errors are in process.

After initialization, the system falls into the input loop represented by FIG. 4. In the preferred embodiment, it is illustrated that the dual micros communicate with each other every one-eighth (⅛) of a second. After initialization of the master receiver which occurs at 102, the master transmitter 104 will communicate with the slave micro 106 to advise the slave micro whether the user has selected a particular set temperature for heating. If no temperature is selected, then a "000" signal is sent. At step 106, the master transmitter next communicates with the slave transmitter receiver to advise whether the oven is operating and, if so, in what mode. The various modes comprise preheat bake, bake, preheat broil, broil, preheat clean, clean, and clean cool-down. Operations comprise not heating, cooking or cleaning.

At step 110, the master transmitter will advise the slave transmitter/receiver whether the operator has pressed a key indicating a particular operation and whether the system is in a power up state.

At step 112, the slave transmitter receiver will advise the master receiver of monitored temperatures obtained from the temperature probe of the system. In particular, the slave transmitter will advise the master receiver whether, based upon the particular model configuration of the system, the monitored temperature cavity point falls above or below certain predetermined temperature points. For example, the data will include identification of whether the oven cavity is below a temperature of 170° F., whether it is below a temperature at which the door can be unlocked, whether the temperature is so hot that it is above a cancellation temperature and whether the temperature is so high to be above a door disable point at which point the door cannot be opened.

Industry requirements are that the door disable be implemented both in the software algorithm, as explained above, and further require some hardware implementation to effect the door being locked against user opening. At step 114, the slave transmitter will communicate based upon its door probe monitoring a status of the door. Door status can comprise open unlocked, closed unlocked and closed locked.

At step 116, the slave transmitter will next communicate various operation flags based upon the operation and mode of the oven. For example, "ALL OPS:" refers to whether the unit is in a factory test mode, whether a low power state exists such as when the unit is not receiving enough power (i.e., a local brown out state). If the system is in a "COOK AND CLEAN" operation, then the slave transmitter will advise the master receiver if heat is being requested so the master receiver can indicate via LED display if power is being supplied to the heating elements or whether a preheat process for the oven cavity has been completed. In both instances, the master receiver will use the data to adjust the display to the user for the communication of the sensed data. For example, when the preheat process is complete, the user will need to know that the oven cavity can be used to start the heating or cooking process.

Lastly, step 116 also includes the communication from the slave transmitter to the master receiver of any sensed errors in process. Such errors would include that either door sensor is inoperative, or the oven temperature sensor is inoperative.

Figure 5A:
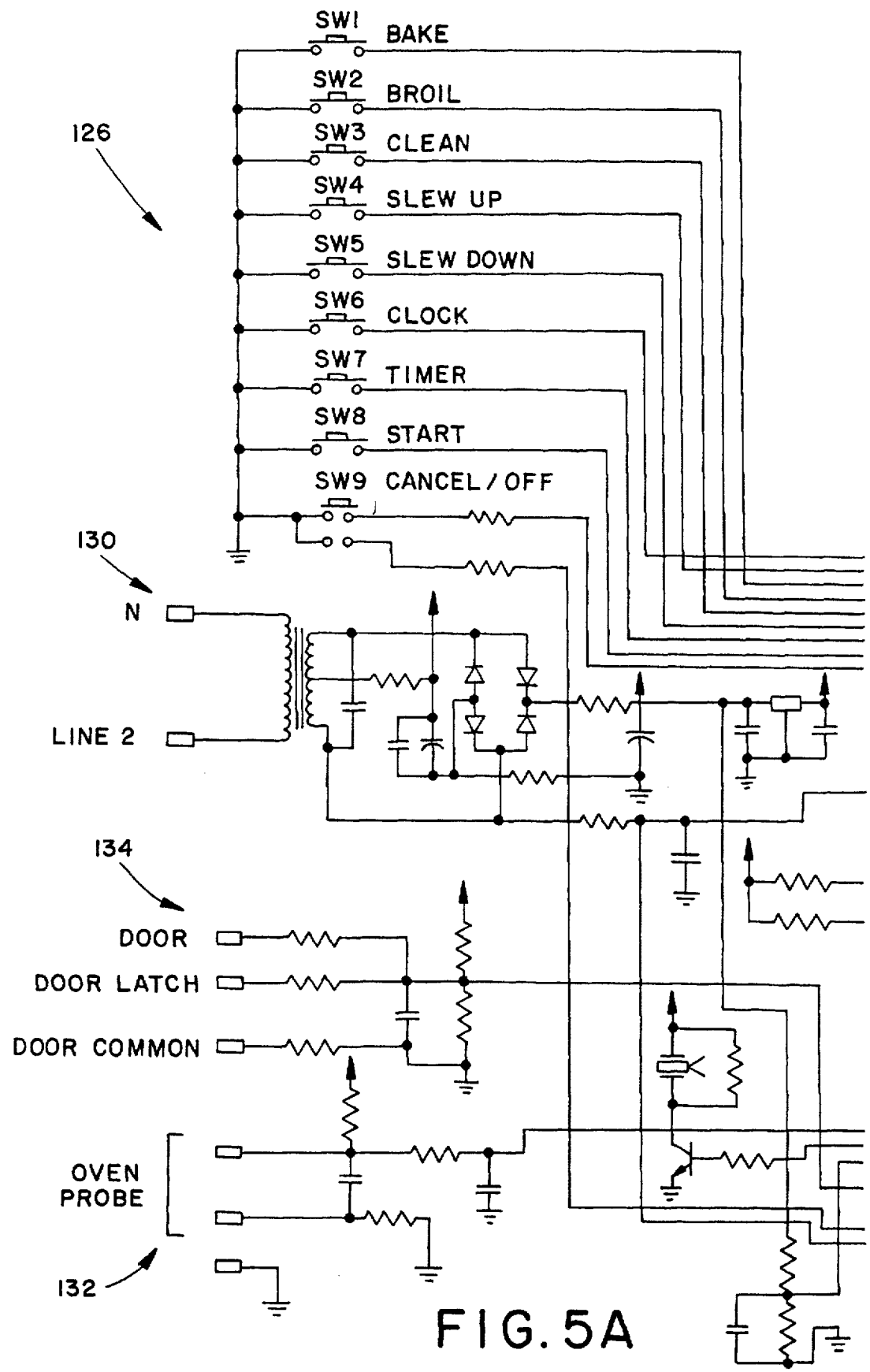
FIG. 5 comprises a detailed schematic of a control circuit formed in accordance with the present invention.
Figure 5B:
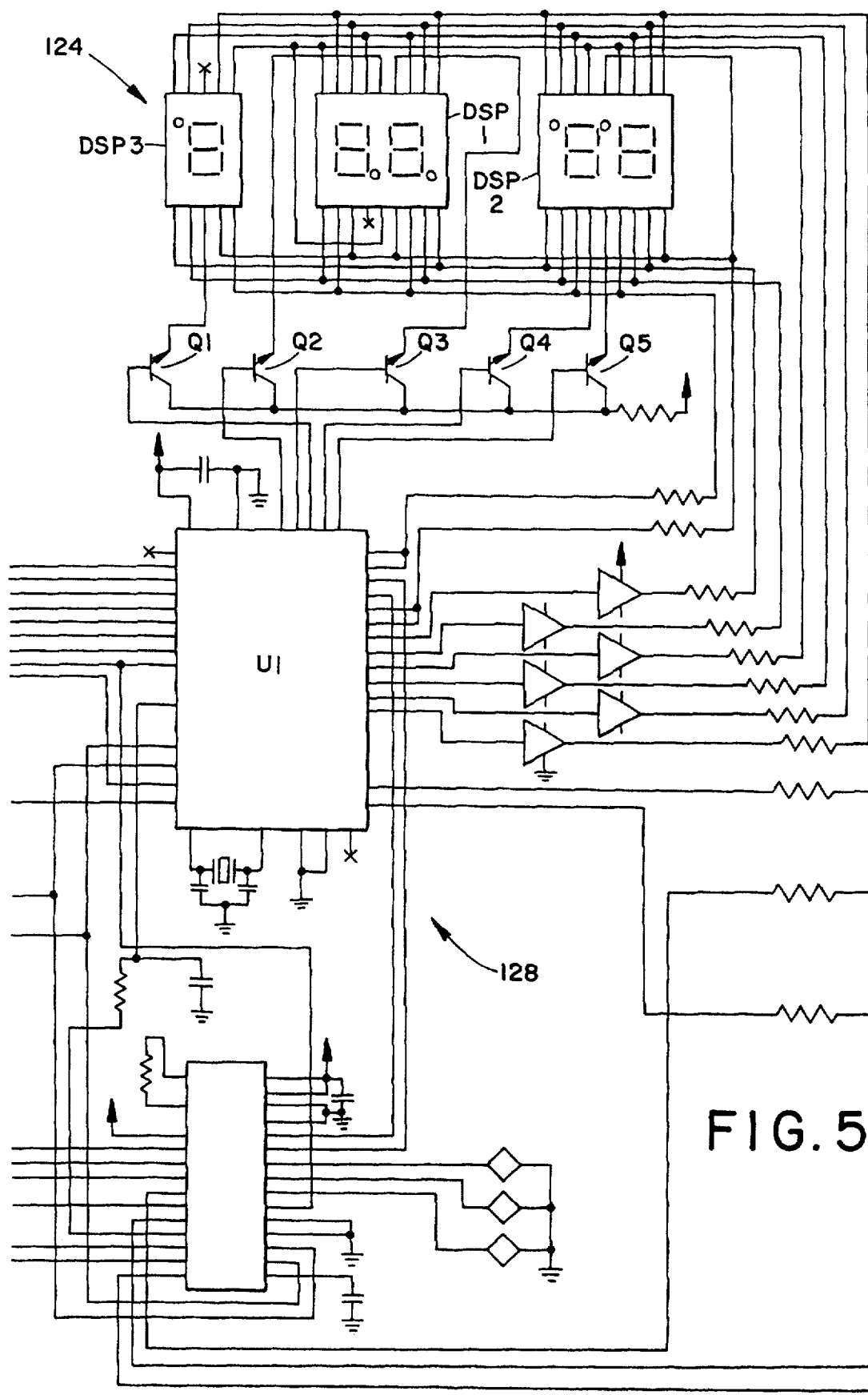
Figure 5C:
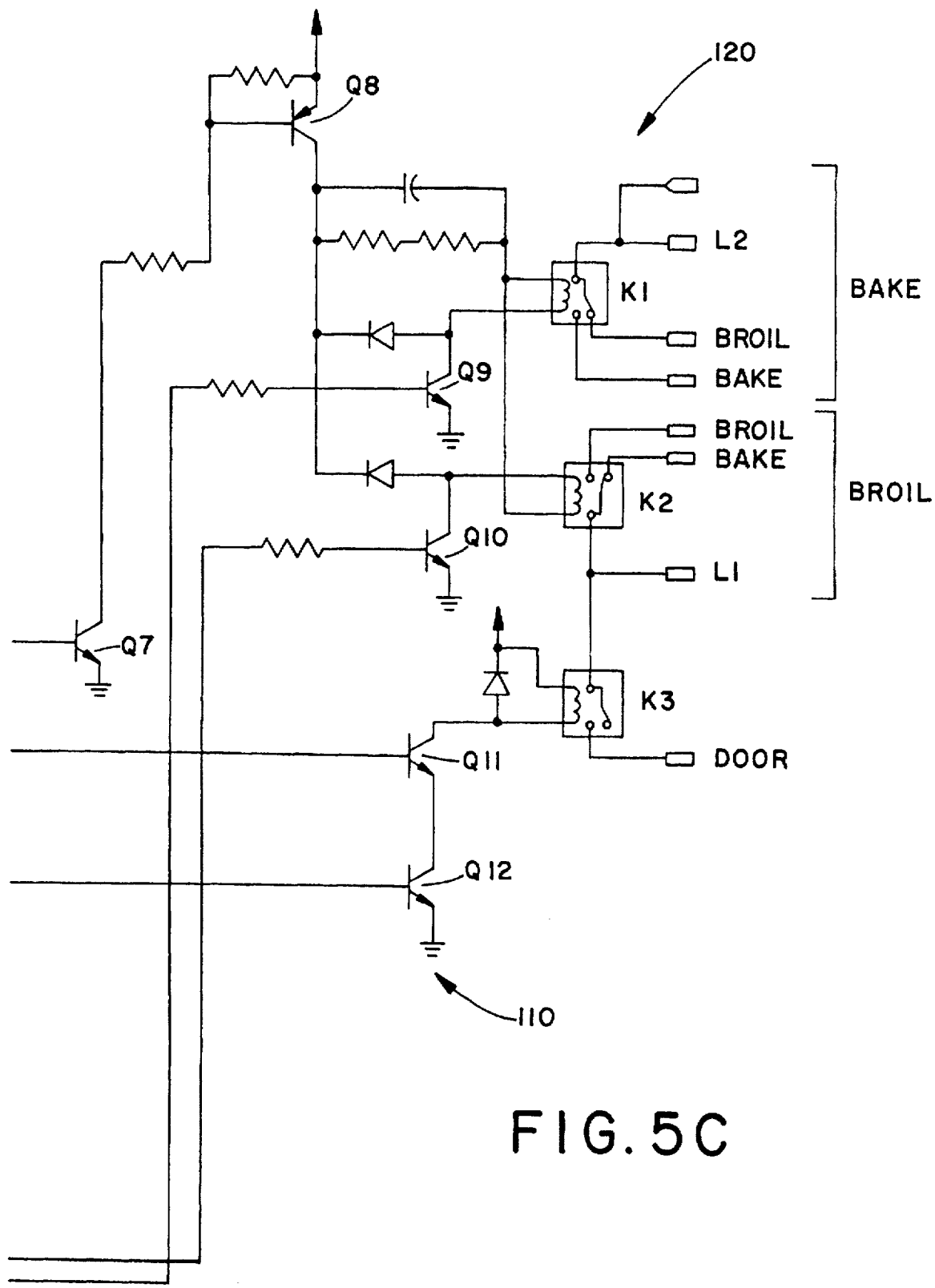

With reference to FIG. 5, the schematic 110 shows one embodiment of a circuit which accomplishes the invention objective and which can be divided into five principal topological areas. Area 120 includes the relays (K1, K2, K3) and connectors (P1, P2, P3) for switching power to the heating coils of the range, as well as the switching transistors for turning the coils on and off, and for locking the door latch. Area 124 comprises the numeric displays for illustrating control conditions, time or temperatures to a user. Area 126 comprises the keypad controls operated by the user. Area 128 includes the dual microprocessors employed to effect the improved structural and operational advantages of the invention; and area 130 comprises the power supply transforming circuit for the microprocessors as well as the safety detection circuits, including an oven temperature probe 132 and door sensor 134.

As noted above, an object of the present invention is an improved control circuit where agency circuitry is accomplished with a substantial reduction in circuit components and cost. This object is accomplished by utilization of the dual microprocessor control comprising a first microprocessor U1 and a second microprocessor U2. Microprocessor U1 is the master and primary processor control unit and includes the algorithms for operating the heating coils in accordance with an operator designated instruction, which algorithms are conventional and not disclosed herein. For principal oven operations such as baking and broiling, it can be seen that relays K1 and K2 are serially connected between power lines L1, L2 and the power connectors for the bake and broil coils. A third relay K3 control the supply of power to a door latch connector for motorized latching of the oven door when oven temperatures demand so for safety reasons, such as during an oven cleaning cycle, as will hereinafter be more fully explained.

The control of power from a voltage supply VUR to the coils K1 and K2 is effected by dual microprocessor control utilizing a signal control from both processors U1 and U2 in the following manner. Processor U1 at pin P1.2 controls the on or off state of transistor Q7 which, by a collector base connection to transistor Q8, controls the on/off state of transistor Q8. The collector of transistor Q8 is connected through filter capacitor C17 to one end of each coil in the relays K1 and K2. The second end of the coil of K1 is connected to the collector of transistor Q9. The on/off state of transistor Q9 is controlled by the second processor U2 by pin connection TCO. Thus, relay K1 requires transistors Q7, Q8 and Q9 all to be viable before the relay can communicate power to the oven heating elements. As far as relay K2 is concerned, the other end of the relay coil is connected to the collector of transistor Q10, whose on/off state is controlled by the second processor U2 by pin SBT. Thus, in order for the relay K2 to communicate power to the oven heating coils, transistors Q7, Q8 and Q10 all must be viable. In other words, both microprocessors U1 and U2 must have initiated their respectively connected transistors to the appropriate on state in order for power to be communicated to the oven heating coils. Both processors U1 and U2 must have received the appropriate signal communications to effect a response signal turning on the appropriate transistors. The dual control results from a circumstance where if either one of the processors detects a condition where power is not to be communicated to the coil, then that processor will fail to initiate its associated transistor to an on state and thus preclude power to the heating coils. Alternatively, if a sudden condition occurs which is determined to require a power interrupt (e.g. door opening), then power can be turned off.

The door latch relay K3 will be closed in a circumstance where the oven is in a self-cleaning mode to preclude opening of the door when the oven cavity is at a dangerously high temperature. It can be seen that the relay coil of relay K3 is serially connected at its one end to the transistors Q11 and Q12. Transistor Q11 is controlled by processor U2 at pin AD4 and transistor Q12 is controlled by processor U1 at pin P1.1. Thus, the door latch circuitry is similarly controlled by a dual microprocessor control scheme in that it requires both processors U1 and U2 to communicate the appropriate signals to their associated transistors for the door latch to be released.

It is a feature of the subject invention that the dual microprocessor control scheme comprises master first microprocessor U1 effecting the primary heating controls for the oven. With reference to area 126 of the schematic, it can be seen that all of the touchpad controls are connected to the first processor U1, except for "START" and "CANCEL/OFF", which are also connected to the second processor U2. The CANCEL/OFF control will effect a reset of the system. The START will effect a common timing initiation for timing and program control to both microprocessors.

The LCD displays shown in area 124 of the schematic similarly are operated solely by the first microprocessor U1 in a conventional display scheme, not relevant to the subject invention.

With particular reference to the area 120 of the schematic, the second microprocessor U2 will monitor certain probe conditions of the safety detection circuits 132, 134, while the first processor U1 is controlling the heating scheme to the oven, so that when probe conditions are not consistent with the desired heating scheme, the dual microprocessor control can effect a shut-down of power to the heating coils. More particularly, it can be seen that the oven probe (generally designated at 132, but not shown) is connected to the pin AD1 of the second microprocessor U2 and the door latch sensor, door sensor and door common are connected to pin AD5 of the second microprocessor U2. The door latch sensor measures an impedance in a wire control of the door latch from which impedance of the processor U2 can determine if the door is latched or unlatched, or if there is a fault in the control wire. The door sensor determines if the door is open or closed. Both the oven probe sensor 132 and the door sensors 134 are monitored by the second microprocessor U2.

Communication between the second slave microprocessor U2 and the first microprocessor U1 is effected between the signal lines between pin P12 of microprocessor U2 and pin P4.2 of microprocessor U1, and pin P13 of microprocessor U2 and pin P4.3 of microprocessor U1. Timing and signal communicating is effected in a serial bit communication scheme, conventionally known. Two of the signal lines are set between the two microprocessors. Pin P3.2 of microprocessor U1 is connected to pin P20 of microprocessor U2 and pin P3.3 of microprocessor U1 is connected to pin 1 P21 of microprocessor U2. These latter two signal lines are in place to coordinate signals relating to the operating of the beeper, typically used when an oven cycle time has timed out. The piezo beeper A1 is driven by pin AD2 of processor U2.

In overall operation, it thus can be seen that the first microprocessor U1 is disposed in operative communication with the operator control switches for primarily controlling the supply of power for principal appliance functions. The second slave processor U2 is in operative communication with the first processor and is disposed for primarily monitoring appliance safety detection circuits (i.e. oven probe, door latch) for controlling the agency circuitry redundancy. Transistors Q9, Q10 and Q11, all of which are controlled by the second processor U2, essentially comprise the agency circuitry for safety redundancy of the supply of power to the heating coil. Only when a first set of switches, comprising transistors Q7, Q8 and Q12, are enabled by the first processor and the second set of switches, comprising transistors Q9, Q10 and Q11, are enabled by the second processor U2 can the respective associated relays be operated.

Various predetermined safety conditions are applicable to the control scheme of the subject invention. Although regulation of the cavity by the oven probe, or locking the oven door against opening when cleaning, have been illustrated as the principal subjects of the subject invention, it is within the skill of those of ordinary skill in the art to apply other conditions that are within the control capacity and safety redundancy of the subject invention.

It should be appreciated that the use of the second microprocessor U2 in combination with the sensor probes and dual path control of the primary power circuits provides a substantial reduction in the part count over prior known systems which would use discrete component parts in association with a single microprocessor to effect a similar oven control scheme. In addition, the subject invention provides an expansion of control capabilities with the use of a second intelligent microprocessor over and above control circuitry comprised of discrete component parts.

In accordance with an alternative aspect of the present invention, the first and second processors can accomplish more shared responsibilities between a primary control and safety redundancy so that more equalized memory requirements between the processors are realized to thereby reduce the memory requirements of any one processor. More specifically, power relay control can be transferred from the first processor to the second processor while disabling control of the relay safety switches can be transferred to the first processor. Similarly transferred functions from the first processor to the second processor could comprise thermistor monitoring and beeper or annunciator control, while functions transferred from the second processor to the first processor could comprise a door safety disable.

In this alternative embodiment, microprocessor U2 would operate as the primary processor control unit for the relay outputs by controlling the on and off states of transistors Q9 and Q10 and would further operate as the primary processor control of the door latch safety circuit by controlling the on/off state of transistor Q11. Microprocessor U1 would thus control the agency safety redundancy circuits by controlling transistor Q7 as a relay safety disable switch and transistor Q12 as a door safety disable switch. Storage of the control algorithms in U2 would operate to equalize the memory storage requirements between microprocessors U1 and U2. Control inputs monitored by microprocessor U1 are communicated to microprocessor U2 through the above-mentioned communication signal lines.

In one embodiment, microprocessor U1 comprised a Samsung KS88C0504 microcontroller and U2 comprised a Panasonic MN 155402, although other competitive products could also have been used.

Some of the software safety feature enhancements achieved by the subject invention include:

1. The door disable software disables the door whenever the oven cavity temperature exceeds 600° F. This routine can discriminate between valid and invalid (shorted sensor) oven cavity temperature.

2. The redundant hardware for a start key press or an off key press is replaced with inputs into both micros. For an oven to begin cooking or cleaning, both micros must see a start key press. To turn off the oven, only one micro must see an off press. The software can discriminate between types of key presses to determine the appropriate logic.

3. The relays can be disabled anytime a fatal error is detected (open/short sensor, cook and clean runaway, or door lock error), and during a power fail or low power state.

4. Either micro has the ability to disable the other and return to a safe condition if either one detects a problem. This replaces a hardware watchdog on the micro-controller.

The invention has been described with reference to the preferred embodiment. Obviously, modifications and alterations will occur to others upon the reading and understanding of the specification. It is our intention to include all such modifications and alterations insofar as they come within the scope of the appended claims or the equivalents thereof.

Having thus described the invention, we now claim:

1. An appliance control circuit for enhanced control operation and agency safety redundancy comprising:
   a first processor disposed in operative communication with operator control switches for primarily software control of a first switch for a supply of power for principal appliance functions;
   a second processor in operative communication with the first processor and disposed for primarily software monitor of appliance safety detection circuits and operator control switches independent of said first processor and for controlling agency circuitry redundancy through a second switch in series with said first switch; and,
   wherein said first and second switches comprise agency circuitry for enabling said supply of power when said first switch is directly enabled by said first processor and said second switch is directly enabled by said second processor for safety redundancy of said supply of power.

2. The appliance control circuit as defined in claim 1 further comprising a plurality of switches directly enabled by said first processor for respectively initiating a plurality of the principal appliance functions and wherein said second switch is serially connected to each of said plurality of switches for switching off said supply of power in accordance with predetermined conditions of said appliance safety detection circuits.

3. The appliance control circuit as defined in claim 1 wherein said circuit comprises an oven control circuit for an oven including a bake circuit and a broil circuit and wherein said second processor includes a bake/broil safety output in communication with said second switch for disabling said bake circuit and said broil circuit in accordance with predetermined conditions of said appliance safety detection circuits.

4. The appliance control circuit as defined in claim 3 wherein said oven includes a temperature probe and a one of said predetermined conditions comprises a sensing of an oven temperature by said probe of a temperature in excess of 600° F. and a detection of an open oven door whereby said second switch is opened by a signal from said second processor at said bake/broil safety output.

5. The appliance control circuit as defined in claim 3 further including a door latch circuit and wherein said second processor includes a door latch safety output in communication with a door latch safety switch.

6. An appliance control circuit comprising:
   a first processor for controlling a first set of circuit functions including means for monitoring operator control switches and for controlling agency circuitry redundancy through a safety disable switch;
   a second processor in operation communication with the first processor for controlling a second set of circuit functions independent of said first processor including means for switching a supply of power for principal appliance functions and for monitoring appliance safety detection circuits; and,
   wherein said safety disable switch and said means for switching comprise agency circuitry for enabling said supply of power to an appliance when said means for switching switch is directly enabled by said second processor and said safety disable switch is directly enabled by said first processor for a safety redundant supply of power.

7. The appliance control circuit as defined in claim 6 wherein said means for switching comprises a plurality of relays each associated with an associated appliance function comprising a bake circuit and a broil circuit and said safety disable switch comprises a door safety disable switch and a relay safety disable switch for disabling said bake circuit and said broil circuit in accordance with predetermined appliance safety conditions.

8. A method for controlling an electrically powered oven for enhanced control operation and agency safety redundancy with a control circuit including first and second processors in operative communication for shared monitoring of circuit conditions and redundant control of power communication to oven heating elements, comprising the steps of:

communicating first control signals from a user operated keypad representative of selected time and temperature parameters of oven operation to the first processor;

determining second control signals representative of said first control signals by said first processor and communicating said second control signals from said first processor to a first power control switch for enabling a supply of power to the oven heating elements;

monitoring an appliance safety detection circuit with said second processor; and, determining third control signals by said second processor in response to said monitoring and communicating said third control signals from said second processor to a second power control switch for enabling the supply of power to the oven heating elements, wherein said supply of power is disabled to the oven heating elements when either said first or second power control switches is switched off by said first and second processors, respectively.

9. The method as defined in claim 8 wherein said monitoring includes probing an oven cavity for temperature and sensing whether an oven door is latched.

10. The method as defined in claim 8 wherein said second processor receives said second control signals and in accordance with a predetermined power control algorithm stored in said second processor, and effects a power relay control of said oven heating elements by controlling said second power control switch.

11. The method as defined in claim 10 wherein said first processor controls disabling the supply of power to the oven heating elements by monitoring oven door safety and power relay safety, and said second processor determines and effects an oven door lock and beeper operation.

* * * * *